Aug. 15, 1950  P. H. WILLIAMS  2,518,845
DEAERATOR AND CORROSION CONTROL EQUIPMENT
Filed May 5, 1945
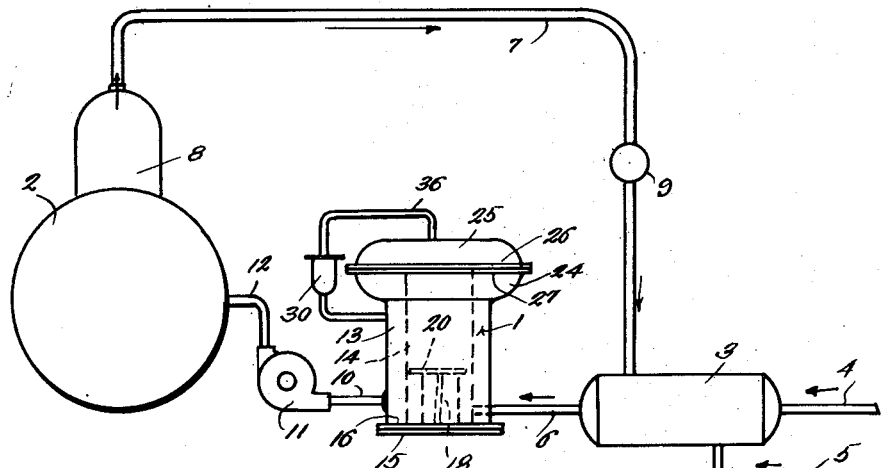
Fig.1
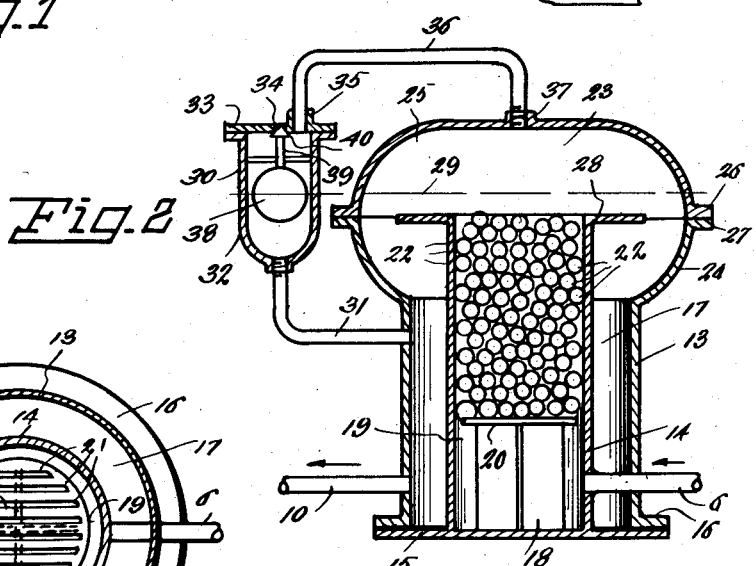
Fig.2
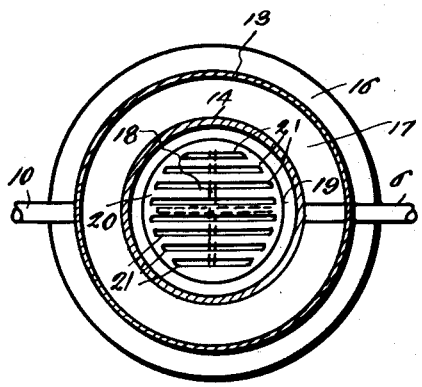
Fig.3
Inventor
*Philip H. Williams*
By
Attorney Patented Aug. 15, 1950

2,518,845

UNITED STATES PATENT OFFICE 2,518,845

DEAERATOR AND CORROSION CONTROL EQUIPMENT

Philip H. Williams, San Jose, Calif., assignor to E. A. Kent, Berkeley, Calif.

Application May 5, 1945, Serial No. 592,211

1 Claim. (Cl. 183—2.5)

This invention relates to deaeration at high temperatures and high pressures and more especially to the deaeration of returning condensate in closed lines where no atmospheric vent or heat exchanger is used.

The present application constitutes a continuation in part of my prior application, filed November 21, 1942, Serial No. 466,495, for Corrosion Control Apparatus.

In many industrial plants it is impractical or too expensive to deaerate the boiler feed water by the conventional atmospheric systems. On the other hand the elimination of entrained air and free oxygen has been found to greatly increase the efficiencies of hot processing machines by preventing air or gas bubble insulation of the heating surfaces, thus providing higher heat transfer rate and cutting the time element as well as protecting boiler and pipe lines against corrosion.

An object of this invention is to provide a simple, compact automatic and highly efficient system for such work at a cost within the reach of medium and small plants.

Another object of the invention is to provide such means for such purpose as shall not require expert attention and attendance and which will be adaptable to established plants without increasing the plant floor space.

Still another object of the invention is to provide such equipment for such purpose which will work efficiently in connection with automatic condensate return system using direct return pumps instead of traps or other drainage means.

It is a well known law that the solubility of oxygen (and entrained air) in water decreases as the temperature rises until at the boiling point, at any given pressure, the solubility or, in other words, the tendency of the water to contain dissolved air and/or free oxygen approximates zero.

In atmospheric or sub-atmospheric deaerators it has been found that the escape of air and oxygen from the water is facilitated by (1) heating the water to near the boiling point, (2) causing an appreciable drop in the pressure over the surface of the water, (3) spreading the water in comparatively thin sheets, and (4) reversing the direction of flow of the water. The present invention provides means for applying these principles to condensate at high temperature and pressure without venting to atmosphere and without the very complicated equipment used in deaeration apparatuses of conventional construction.

The invention is illustrated in the accompanying drawings wherein:

Figure 1 is a diagrammatic view showing a deaerator of the improved construction in use.

Figure 2 is a sectional view taken vertically through the improved deaerator.

Figure 3 is a sectional view taken transversely through the deaerator.

This improved deaerator, which is indicated in general by the numeral 1 has been shown installed for use in Figure 1 between the boiler 2 and a heater 3. An inlet pipe 4 is connected with the outer end of the heater and the heater also has connected with an under portion a pipe 5 through which condensate flows from a water coil or the like to the heater where it is heated to high temperature and discharged through pipe 6. A pipe 7 leads from the dome 8 of the boiler to the heater and in this pipe is a thermostat 9 for maintaining high pressure on the heater, the heat and pressure in the heater being such that while the condensate will be heated to high temperature, the temperature will be less than boiling point and very hot water at a temperature slightly less than boiling point will be discharged from the heater through pipe 6. This water flows through the deaerator 1 where air and gases are removed from it and the deaerated water then flows through pipe 10 to a pump 11 which forces the water through pipe 12 back to the boiler 2.

The deaerator is constructed as shown in Figures 2 and 3 and has an outer shell or casing 13 and an inner shell or casing 14, the inner shell having a base or bottom 15 which is of appreciably greater diameter than the inner shell and to which the outstanding bottom flange 16 of the outer shell is secured in any desired manner. The two shells are spaced from each other, thus providing a space or annular chamber 17 through which deaerated water flows downwardly and out through the discharge pipe 10 to the pump. The pipe 6 passes through the outer shell near the lower end thereof and is secured through the wall of the inner shell so that the condensate to be deaerated will be delivered into the inner shell near its bottom.

A pedestal or support 18, which is cross-shaped in cross section or end elevation, rests upon the bottom of the inner chamber 19 defined by the inner shell and this support carries at its upper end a plate 20 formed with a plurality of spaced parallel slots 21 and constituting a grid for supporting a mass of spheres 22 formed of glass which has a very pronounced affinity for air and gas bubbles present in returned condensate or other boiled feed water. Balls of glass are used since it has been found that air and gas bubbles will very quickly adhere or gather thereon whereas spheres of marble or baked clay are inert and the bubbles will not collect thereon. It has also been found that spheres formed of stainless steel, copper, or brass will, to a slight extent, serve as bubble collectors but are not as effective as glass spheres. The balls or spheres 22 not only serve as collectors for air or gas bubbles but also serve as means for retarding upward flow of water through the inner chamber 19 since the water must flow through the small spaces between the balls after moving upwardly about the margin of the diffuser plate 20 and through the slots 21 thereof.

The inner shell projects upwardly into a chamber 23 above chamber 17, and referring to Figure 2 it will be seen that this chamber is formed by the flared upper portion 24 of the outer shell and the dome-shaped hood 25 which has its outstanding flange 26 firmly secured to the flange 27 of the flared portion 24. An annular flange or flat shelf 28 surrounds the upper end of the inner shell 14 and when the deaerator is filled with water to the level indicated by line 29 this shelf and the upper end of the inner shell will be covered by a thin film of water. The path of circulation of the water in the deaerator is upwardly through the inner chamber 19 about the glass balls 22 and radially across the shelf and then downwardly through space 17 to the bottom thereof where it flows outwardly through the discharge pipe 10 to the pump 11.

The water level is to be maintained at the level indicated by line 29 and air and gas allowed to intermittently escape from chamber 23. In order to so control escape of the air and gas there has been provided an air trap or valve 30 disposed externally of the head or dome of the outer shell the said trap being located at a side of the head or drum and connected with the chamber 17 by a pipe 31 leading from a side of the outer shell and communicating with the valve casing 32 through the bottom thereof so that water may flow from the outer shell into the casing of the trap. This valve casing is disposed vertically and at its upper end is provided with a removable cover 33 formed with an escape port 34 and carrying a boss 35 formed with a bore into which is secured one end of a pipe 36 which has its other end screwed into the bore of a boss 37 rising from the center of the hood 25. A buoyant valve ball 38 is housed in the valve casing 30 and carries an upstanding stem 39 having a head 40 at its upper end and since the casing 32 is filled with water to the height of the line 29 the valve head 40 will be normally held in closing relation to the escape port 34. As bubbles accumulate upon the glass spheres 22 they gradually increase in size until they detach themselves from the spheres and rise to the surface of the water in the chamber 23. The air and gases gradually fill the chamber 23 and pass through pipe 36 into the upper portion of the valve casing 32 and pressure in the chamber 23 and the upper portion of the valve chamber gradually increases until the pressure is sufficient to depress the water and lower the float valve 32 to such an extent that air may escape through the port 34.

The operation of the deaerator is as follows:

Returning condensate is delivered to the heater where its temperature is maintained at the desired high point by live steam delivered from the boiler to the heater through pipe line 7 having the thermostat 9 therein. From the heater the condensate, now at a temperature very close to boiler temperature, flows through the pipe 6 into the inner shell 14 and upwardly through chamber 19 around and through the diffuser plate 20 and upwardly through the small spaces between the glass balls 22 to the top of the inner shell where it spreads out in a thin layer over the shelf 28. Upon reaching the margin of the shelf the water flows downwardly from the edge of the shelf and downwardly through the lower portion of chamber 23 and the annular space or chamber 17 between the inner and outer shells and out through pipe 10 through which it flows to the pump 11 which forces the water through pipe 12 to the boiler. If the deaerator is mounted at a point sufficiently high above the boiler gravity may be depended upon for flow of water from the deaerator to the boiler. The glass balls not only serve to remove air and gas from the water but also serve to retard flow of concentrate through the deaerator so that the gravity drop to the boiler (if the deaerator is placed above the boiler) of the pressure drop caused by the pump tends to cause an appreciable pressure drop between the entrance point and the discharge point of the deaerator. The glass spheres present an extensive surface for contact by the upwardly flowing condensate and this greatly facilitates adherence of the bubbles to the glass balls. The condensate enters the inner chamber 19 at a temperature resulting in the air and free oxygen being in a state of steam-borne minute bubbles which pass upwardly over the glass balls and this facilitates collection of the bubbles upon the balls, the bubbles gradually increasing in size by coalescent action until they become so buoyant that they break loose from the glass balls and rise to the surface of the water in the separation chamber 23. The increase in exposed surface of the collecting elements, the shallow depth of the water over the shelf 28, and the spreading out of the water over the shelf and the reversal of flow as the water flows downwardly about the inner shell under the decrease of pressure above the ledge or shelf greatly facilitates the separation of the bubbles from the condensate. The valve controlled air vent retains air under pressure in the chamber 23 over the water and intermittently allows air to escape when its pressure increases above a predetermined point. Use of a pump to return the condensate to the boiler causes the pressure at the deaerator to be lower than at the boiler and consequently the steam making or boiling point will be lower than at the boiler. This being true there will be sufficient heat in the steam so that, controlled by the thermostat, it will maintain the condensate temperature at the highest point at which it may be safely pumped. It has been found that this is sufficiently high to effect very efficient deaeration. In the event gravity drainage of the deaerator is used placing the deaerator above the level of the boiler (with a check valve between the deaerator and the boiler) will give the same results, the gravity drain taking the place of the return pump and the deaerator making the heat of the steam adequate for deaeration as with the pump.

Having thus described the invention what is claimed is:

A device for removing air and gas from condensate comprising a solid bottom, inner and outer shells rising from said bottom in spaced and concentric relation to each other to provide space surrounding the inner shell, the outer shell having an enlarged upper portion forming the lower portion of an expansion chamber, a hood secured upon margins of the enlarged upper portion of the outer chamber and forming the upper portion of the expansion chamber, said inner shell having its upper portion extending upwardly into the expansion chamber and surrounded at its upper end by an outstanding annular flange substantially flush with and spaced from the upper edge of the enlarged upper end portion of the outer shell, a diffusion plate in the inner shell spaced upwardly from the bottom, an inlet pipe communicating with the inner shell below said diffusion plate, an outlet pipe leading from the lower end portion of the outer shell, a mass of small glass balls filling the portion of the inner shell above the diffusion plate for gathering bubbles from condensate passing upwardly in the inner shell through small spaces between the glass balls, and float controlled means for intermittently allowing escape of gas and air from the top of the expansion chamber.

PHILIP H. WILLIAMS.

REFERENCES CITED

The following references are of record in the file of this patent:

UNITED STATES PATENTS

| Number | Name | Date |
|---|---|---|
| 439,695 | See | Nov. 4, 1890 |
| 700,068 | Morrison | May 13, 1902 |
| 1,047,534 | Joseph | Dec. 17, 1912 |
| 1,119,980 | Mulligan | Dec. 8, 1914 |
| 1,369,759 | Hill | Feb. 22, 1921 |
| 1,399,592 | Wehner | Dec. 6, 1921 |
| 1,754,722 | Lucke | Apr. 15, 1930 |
| 1,849,900 | Allen | Mar. 15, 1932 |
| 1,864,037 | Atkins | June 21, 1932 |
| 1,884,051 | McCoy | Oct. 25, 1932 |
| 2,018,901 | Rush | Oct. 29, 1935 |
| 2,376,794 | McCulloch | May 22, 1945 |

FOREIGN PATENTS

| Number | Country | Date |
|---|---|---|
| 157,789 | Great Britain | Dec. 15, 1921 |
| 682,846 | Germany | Oct. 25, 1939 |